(12) United States Patent
Darabi

(10) Patent No.: US 7,551,910 B2
(45) Date of Patent: Jun. 23, 2009

(54) TRANSLATION AND FILTERING TECHNIQUES FOR WIRELESS RECEIVERS

(75) Inventor: Hooman Darabi, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 491 days.

(21) Appl. No.: 11/434,038

(22) Filed: May 15, 2006

(65) Prior Publication Data

US 2007/0264943 A1    Nov. 15, 2007

(51) Int. Cl.
H04B 1/40    (2006.01)

(52) U.S. Cl. .................. 455/296; 455/307; 455/323

(58) Field of Classification Search ........... 455/266, 455/295, 296, 302, 304, 305, 307, 315, 317, 455/323; 375/346, 350, 351
See application file for complete search history.

(56) References Cited

U.S. PATENT DOCUMENTS

| | | | |
|---|---|---|---|
| 5,564,093 A * | 10/1996 | Matsumoto | 455/266 |
| 5,758,296 A * | 5/1998 | Nakamura | 455/307 |
| 6,404,293 B1 | 6/2002 | Darabi et al. | |
| 6,845,232 B2 | 1/2005 | Darabi | |
| 6,845,233 B2 | 1/2005 | Louis et al. | |
| 6,862,438 B2 | 3/2005 | Darabi | |
| 6,931,267 B2 | 8/2005 | Darabi | |
| 6,961,552 B2 | 11/2005 | Darabi et al. | |
| 6,967,619 B2 * | 11/2005 | Khoo et al. | 455/307 |
| 6,968,019 B2 | 11/2005 | Darabi et al. | |
| 6,970,681 B2 | 11/2005 | Darabi et al. | |
| 7,013,117 B2 | 3/2006 | Darabi | |
| 7,013,118 B2 | 3/2006 | Darabi et al. | |
| 7,031,668 B2 | 4/2006 | Darabi et al. | |
| 2002/0094037 A1 | 7/2002 | Darabi et al. | |
| 2003/0067359 A1 | 4/2003 | Darabi et al. | |
| 2003/0092465 A1 | 5/2003 | Darabi | |
| 2003/0181175 A1 | 9/2003 | Darabi | |
| 2003/0181176 A1 | 9/2003 | Darabi | |
| 2003/0181179 A1 | 9/2003 | Darabi | |
| 2003/0181180 A1 | 9/2003 | Darabi et al. | |
| 2003/0181181 A1 | 9/2003 | Darabi | |
| 2003/0181184 A1 | 9/2003 | Darabi et al. | |
| 2003/0181188 A1 | 9/2003 | Darabi | |
| 2003/0181190 A1 * | 9/2003 | Sorrells et al. | 455/295 |
| 2004/0001560 A1 | 1/2004 | Darabi | |
| 2004/0102173 A1 | 5/2004 | Darabi | |
| 2005/0130615 A1 | 6/2005 | Darabi | |
| 2005/0164671 A1 | 7/2005 | Darabi | |
| 2005/0197092 A1 | 9/2005 | Darabi | |
| 2005/0237100 A1 | 10/2005 | Chiu et al. | |
| 2006/0002491 A1 | 1/2006 | Darabi et al. | |
| 2006/0003719 A1 | 1/2006 | Darabi | |
| 2006/0035609 A1 | 2/2006 | Darabi et al. | |
| 2006/0035668 A1 | 2/2006 | Li et al. | |

(Continued)

Primary Examiner—Thanh C Le
(74) Attorney, Agent, or Firm—Brake Hughes Bellermann, LLP; R. Edward Brake

(57) ABSTRACT

Various embodiments are disclosed relating to wireless receivers. According to an example embodiment, a method and apparatus are provided. The method may include receiving an input signal within a first frequency range (e.g., RF). The input signal may include a desired signal and a blocker signal. The method may also include down-converting the input signal to a second frequency range (e.g., IF) that is lower than the first frequency range, separating the blocker signal from desired signal (e.g., at the second frequency range), up-converting the separated blocker signal to the first frequency range (e.g., RF), and subtracting the up-converted blocker signal from the input signal.

20 Claims, 6 Drawing Sheets

U.S. PATENT DOCUMENTS

| | | |
|---|---|---|
| 2006/0091919 A1 | 5/2006 | Darabi et al. |
| 2006/0091948 A1 | 5/2006 | Darabi |
| 2006/0091954 A1 | 5/2006 | Darabi |
| 2006/0091957 A1 | 5/2006 | Darabi et al. |
| 2006/0091968 A1 | 5/2006 | Darabi et al. |
| 2006/0093072 A1 | 5/2006 | Darabi |
| 2006/0094361 A1 | 5/2006 | Darabi et al. |
| 2006/0094381 A1 | 5/2006 | Darabi et al. |
| 2006/0094386 A1 | 5/2006 | Darabi |
| 2006/0094387 A1 | 5/2006 | Darabi |
| 2006/0094390 A1 | 5/2006 | Pan et al. |
| 2006/0094391 A1 | 5/2006 | Darabi |

* cited by examiner

TRANSLATION AND FILTERING TECHNIQUES FOR WIRELESS RECEIVERS

BACKGROUND

Wireless transceivers are used in a wide variety of wireless systems. A wireless transceiver may typically include a wireless receiver for receiving and demodulating signals, and a transmitter for modulating signals for transmission. A wireless signal may receive a signal, including a desired signal and a blocker or unwanted signal in some instances. The received signal may be received at an RF frequency (radio frequency or other wireless transmission frequency), such as between 1 GHz and 2 GHz, for example. In one example wireless standard, a desired signal may be received at an RF frequency of around 1.9 GHz, and a blocker may be present as close as 70 MHz from the desired signal and at 99 dBm higher than the desired signal, for example. Wireless systems typically use a SAW (surface acoustic wave) filter high to provide a high Q or sharp bandpass filter to separate the desired signal from the blocker at RF frequencies. While providing a high Q filter at RF frequencies, the use of SAW filters may typically add significant cost of the wireless transceiver because SAW filters are typically external filters, not on-chip filters. Also, in some cases, a separate SAW filter may sometimes be used for each frequency band, further increasing the cost for multi-band transceivers. Also, a SAW filter may also have up to a 3 dB loss, and since it is typically provided at or before a low noise amplifier (LNA), the 3 dB loss of the SAW filter may also typically degrade the sensitivity of the LNA by the same amount, at least in some cases.

SUMMARY

Various embodiments are disclosed relating to wireless systems, and also relating to translation and filtering techniques for wireless receivers.

According to an example embodiment, a method is provided. The method may include receiving an input signal within a first frequency range (e.g., RF). The input signal may include a desired signal and a blocker signal. The method may also include down-converting the input signal to a second frequency range (e.g., IF) that is lower than the first frequency range, separating the blocker signal from desired signal (e.g., at the second frequency range), up-converting the separated blocker signal to the first frequency range (e.g., RF), and subtracting the up-converted blocker signal from the input signal. The method may also include making a determination that the input signal includes the blocker signal. In this manner, according to an example embodiment, a blocker signal may be removed or subtracted from an input signal using a filter at IF, and other circuitry, without requiring an external SAW filter. In other embodiments, the method or technique may be used with an external SAW filter.

According to another embodiment, an apparatus may be provided in a wireless receiver. The apparatus may include a first mixing circuit to receive an input signal at a first frequency range (e.g., RF). The input signal may include at least a desired signal. In some cases, the input signal may also include a blocker signal. The first mixing circuit may be configured to down-convert the received input signal from the first frequency range to a second frequency range (e.g., IF) that is lower than the first frequency range. The apparatus may also include a filter configured to separate the blocker signal, if present, from the desired signal, and a second mixing circuit configured to up-convert the separated blocker signal to the first frequency range. The apparatus may also include a sub- traction circuit configured to substantially subtract or remove the separated blocker signal, if present, from the input signal at the first frequency range to substantially output the desired signal.

DETAILED DESCRIPTION

Figure 1:
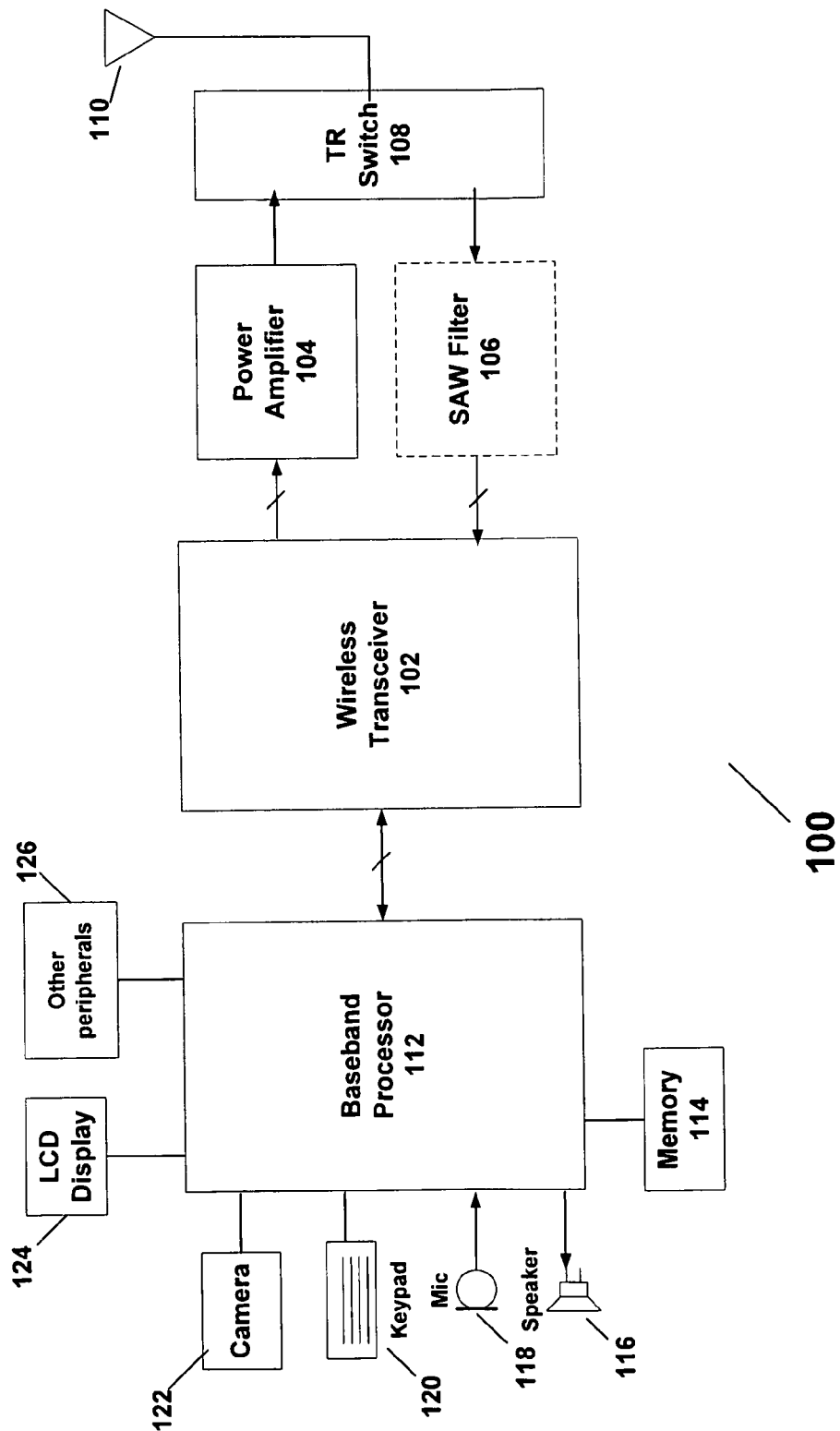
FIG. 1 is a block diagram of a wireless system according to an example embodiment.

FIG. 1 is a block diagram of a wireless system according to an example embodiment. Wireless system 100 may include a wireless transceiver (transmitter/receiver) 102 for transmitting and receiving radio or wireless signals. A baseband processor 112 is coupled to wireless transceiver 110 to perform various types of processing and overall control of system 100, and may perform other tasks. Baseband processor 112 may include a controller, and may include for example, an audio codec to process audio signals, a video or image processing codec (e.g., an MPEG4 compression and/or decompression module), and other components or blocks, not shown.

An antenna 110 may be provided to receive and transmit radio signals or electromagnetic signals. A transmitter/receiver (TR) switch 108 may select either the transmit or receive mode for the antenna 110. Signals output by wireless transceiver 102 to be transmitted may be amplified by amplifier 104 and then transmitted via antenna 110. Signals at radio frequency (RF) (which may be a wireless transmission frequency, not limited to a specific range of frequencies) may be received via antenna 110 may, for example. The received RF signals may be filtered by a SAW (surface acoustic wave) filter 106 (or other filter) and then input to transceiver 102. The SAW filter 106 may typically be separate from the wireless transceiver 102, according to an example embodiment. The SAW filter 106 may, for example, provide a high Q or relatively sharp bandpass filter to select or filter a band or range of frequencies at RF. In another example embodiment, SAW filter 106 (or other SAW filter) may in some cases be omitted, for example through the use of the translation and/or filtering techniques described in greater detail below with respect to FIGS. 2-6.

At transceiver 102, the received signals may be processed or demodulated, which may include down-converting the signals to an intermediate frequency (IF) and then down-converting to baseband or other frequency, digital detection of data and other signal processing. Likewise, digital data to be transmitted may be received by transceiver 102 from baseband processor 112. Wireless transceiver 110 may modulate the digital data from baseband processor 112 onto a selected channel or frequency (or range or spectrum of frequencies) for transmission over antenna 110.

A variety of blocks or peripherals may be coupled to baseband processor 112. For example, a memory 114, such as a Flash memory or Random Access Memory (RAM), may store information. A microphone 118 and speaker 116 may allow audio signals to be input to and output by wireless system 100, such as for a cell phone or other communications device. A keypad 120 may allow a user to input characters or other information to be processed by wireless system 100. A camera 122 or other optical device may be provided to allow users to capture photos or images that may be processed and/or stored by system 100 in memory or other storage location. Wireless system 100 may also include a display 124, such as a liquid crystal display for example, to display information (text, images, etc.). A variety of other peripherals 126 may be coupled to baseband processor 112, such as a memory stick, an audio player, a Bluetooth wireless transceiver, a USB (Universal Serial Bus) port, or other peripheral. These are merely a few examples of the types of devices or peripherals that may be provided as part of wireless system 100 or coupled to baseband processor 112, and the disclosure is not limited thereto.

Wireless system 100 may be used in a variety of systems or applications, such as a mobile or cellular phone, a wireless local area network (WLAN) phone, a wireless personal digital assistant (PDA), a mobile communications device, or other wireless device. In an example embodiment, wireless system 100 may be capable of operating in a variety of transmit/receive frequencies or frequency bands and for a variety of different standards or communications protocols. Although not required, wireless system 100 may be a multi-band wireless system capable of transmitting or receiving signals on one of a plurality of frequencies or bands. For example, wireless system 100 may operate at or around 1900 MHz for WCDMA (Wide-Band Code Division Multiple Access) or PCS (Personal Communications Services), at or around 1800 MHz for DCS (Distributed Communication Services) (these frequencies may be considered an upper band of frequencies), at 850 MHz for GSM (Global System for Mobile communication), at or around 900 MHz for EGSM (Extended GSM) (these frequencies may be considered a lower band of frequencies). These are merely some example frequencies, and the system 100 may operate at many other frequencies and standards.

The term RF (also known as radio frequency) may refer to any transmitted wireless signal frequency range, and is not limited to a specific frequency band or range. Rather, RF signals may be signals received at the 1.9 GHz range, 1.8 GHz range, 850 MHz range, 900 MHz range, other wireless transmission frequency ranges, etc. The term IF (or intermediate frequency) may refer to a frequency range, which may be variable, and that is typically lower than RF. Circuits within a wireless receiver typically down-convert or translate received signals from an RF frequency to an IF frequency to perform some types of processing in some cases. In some cases, an IF frequency range may include frequencies relatively close to zero Hz (as compared to RF), such as 1 KHz, 20 KHz, 100 KHz, 200 KHz, 500 KHz, 900 KHz, etc., or other appropriate IF frequency.

Figure 2:
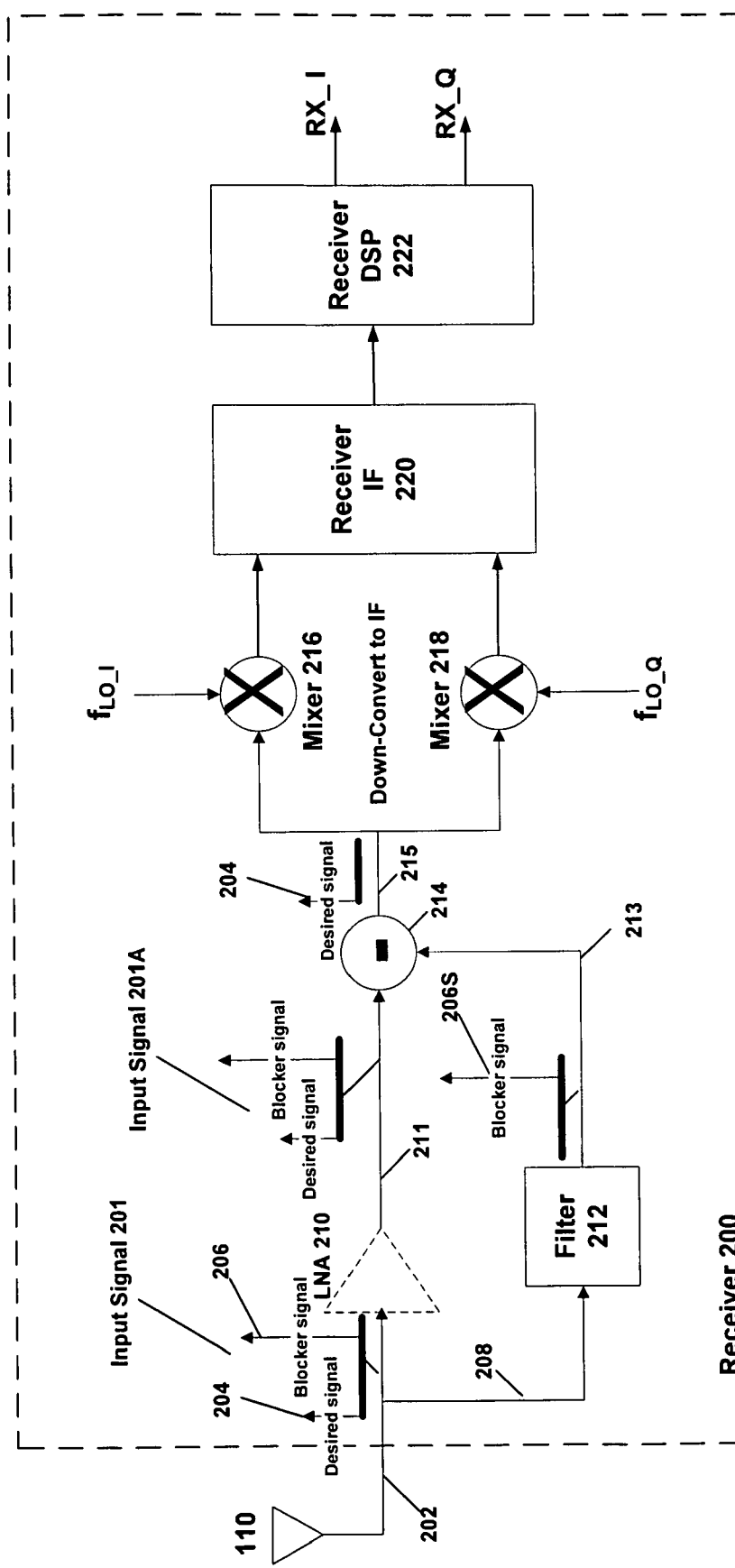
FIG. 2 is a block diagram of a wireless receiver according to an example embodiment.

FIG. 2 is a block diagram of a wireless receiver according to an example embodiment. Wireless receiver 200 may be included within wireless transceiver 102, for example. An RF input signal 201 may be received via antenna 110 and input via line 202 to LNA 210, which may be an amplifier, such as a low noise amplifier (LNA) in an example embodiment. The received input signal 201 may include a desired signal 204 at RF. In some cases or at various times, the received RF input signal 201 may also include a blocker signal 206 (or other undesirable signal) at RF frequency range. LNA 210 may amplify the input signal 201 and output an amplified input signal 201A via line 211. Input signal 201A may be the same as input signal 201, or may typically be an amplified version of input signal 201, for example. Amplifier may be optional, in an example embodiment.

In an illustrative example, the desired signal 204 may be received at −99 dBm, while the blocker signal 206 may be at a level of 0 dBm, for example. Also, in an example wireless standard, an example desired signal may be provided at a frequency around 1990 MHz at around −99 dBm, while a blocker signal may be at 0 dBm and may be only 70 MHz greater than the desired frequency, for example (e.g., blocker at 2060 MHz at RF), but this is merely an illustrative example. A SAW filter may typically be used to perform the filtering or separation of the desired signal from the blocker signal at RF. However, SAW filters may be relatively expensive. According to various example embodiments, filtering or translation and filtering techniques may be used to separate the blocker signal from the desired signal without use of a SAW filter. The various filtering and translation techniques described herein, in some cases, may also be used with SAW filters, for example.

According to an example embodiment, the received input signal 201 (including desired signal 204 and blocker signal 206) may be input via line 208 to a filter 212, which may be a bandpass filter, for example. Filter 212 may filter or separate blocker signal 206 from desired signal 204 at RF, and may output the separated blocker signal 206S at RF via line 213 to a subtraction circuit 214. Subtraction circuit 214 may receive as inputs, the input signal 201A at RF via line 211 including desired signal 204 and blocker signal 206, as well as the separated blocker signal 206S at RF received via line 213 from filter 212. Subtraction circuit 212 may substantially subtract (or substantially remove or attenuate) the blocker signal 206S output by filter 212 from the input signal 201A, thereby substantially outputting the desired signal 204 onto line 215. This subtraction may involve, for example, attenuating or reducing the blocker signal 206 in input signal 201A by 30-40 dB, for example, or by some other amount, based on substantially the same blocker signal 206S being received via line 213. Therefore, according to an example embodiment, subtraction circuit 214 may substantially subtract, remove, or attenuate the blocker signal 206 from the input signal 201A and thereby substantially output the desired signal 204 at RF via line 215.

According to an example embodiment, subtraction circuit 214 may perform a subtraction. In an alternative embodiment, in order to perform subtraction, subtraction circuit 214 may phase shift blocker signal 206S received via line 213 by 180 degrees (or blocker signal 206S may be already phase-shifted) and then add the phase-shifted blocker signal 206S to the input signal 201A, for example. Also, according to example embodiments, LNA 210 may be located before subtraction circuit 214 (as shown in FIG. 2), or may be located after subtraction circuit 214.

The desired signal 204 output at RF onto line 215 may be input to one or more mixers, such as mixers 216 and 218, for example for down conversion or frequency translation to an IF frequency. Quadrature mixers 216 and 218 may, for example, also receive an in-phase local oscillator (LO) signal ($f_{LO\_I}$) and a quadrature-phase local oscillator (LO) signal ($f_{LO\_Q}$), respectively. Mixers 216 and 218 may operate to down convert or frequency translate the desired signal 204 received via line 215 from RF (which may be at, e.g., ~1.9 GHz, ~1.8 GHz, ~850 MHz, ~900 MHz or other frequency range) to an intermediate frequency (IF), which may typically be less than the RF frequency for desired signal 204. An IF frequency may be used, for example, of 100 KHz, 200 KHz, or any other appropriate IF frequency. While quadrature mixers 216, 218 are illustrated in the example of FIG. 2 for the down-conversion from RF to IF, any type of mixers may be used. To be able to accommodate input signals 201 at different RF frequency ranges and different channels within a range, $f_{LO}$ may be a variable frequency, and may be generated or synthesized using a frequency synthesizer, for example.

The IF signals output by mixers 216 and 218 may be input to receiver IF block 220 (which may include, for example, filters, gain control and other circuits) where IF processing is performed. The signals output by receiver IF block 220 may be input to a receiver DSP 222, which may include, for example, gain control and digital signal processing to down convert the IF signal to baseband. Receiver DSP 222 may output in-phase and quadrature-phase receive signals (RX_I, Rx_Q, respectively). The receive signals (RX_I and RX_Q) may be output to baseband processor 112 (FIG. 1) for baseband processing, for example.

Figure 3:
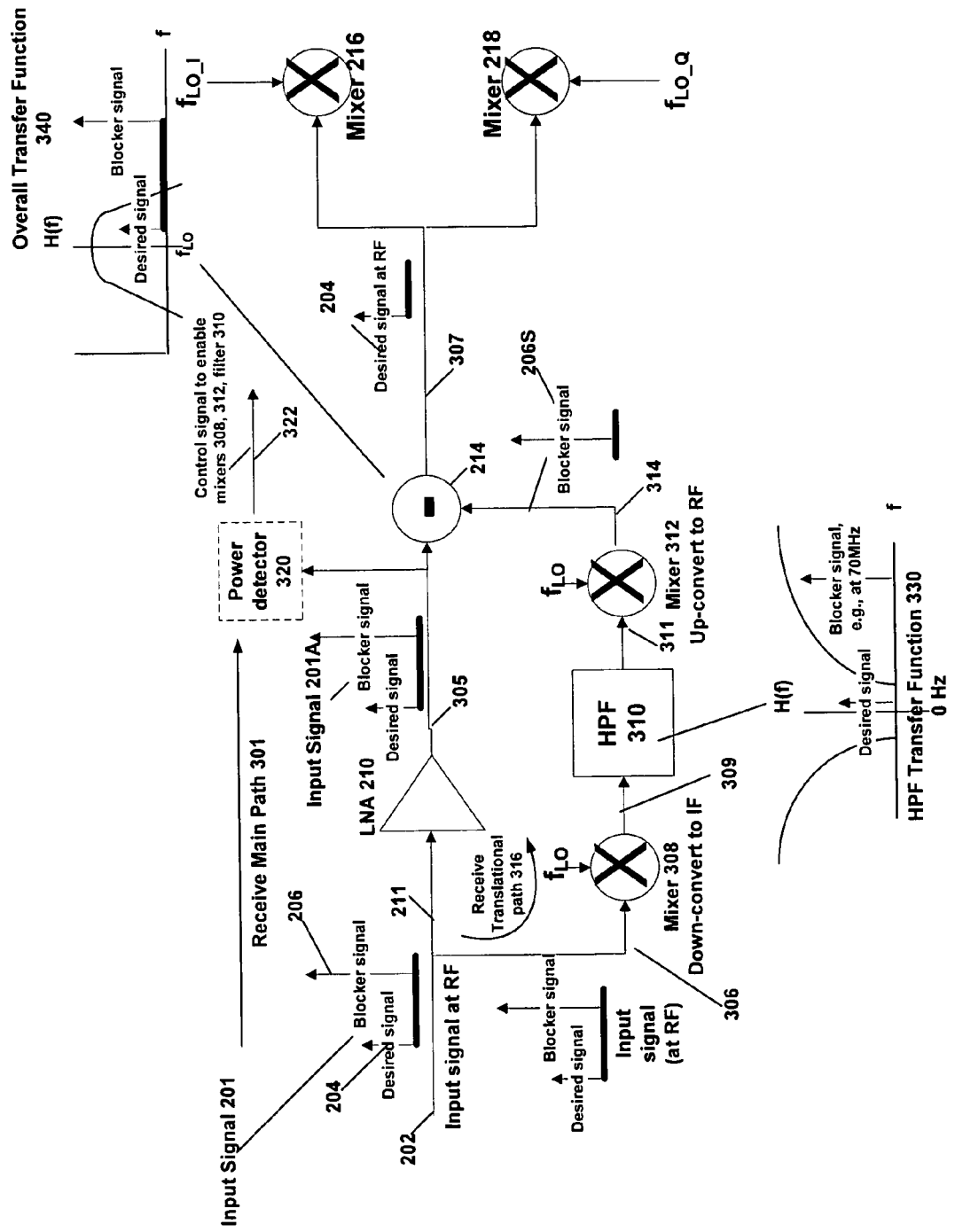
FIG. 3 is a block diagram of a circuit that may be provided in a wireless receiver according to another example embodiment.

FIG. 3 is a block diagram of a circuit that may be provided in a wireless receiver according to another example embodiment. An input signal 201 at RF frequency range 201 is received and input via line 202 to LNA 210. The input signal 201 may include a desired signal 204 at RF frequency range. In some cases or instances, the input signal 201 may also include a blocker signal 206 at or around an RF frequency range. LNA 210 may amplify the input signal 201 and output an amplified input signal 201A onto line 305, for example. The path from line 202, LNA 210 and line 305 may be referred to as a receive main path 301.

In an illustrative example, the input signal 201 may be received at around the RF frequency of around 1990 MHz, for example, with the desired signal at around 1990 MHz and the blocker signal 206 at RF at a frequency that is 70 MHz higher in frequency than the desired signal 204 (e.g., blocker signal 206 at approximately 2060 MHz in an illustrative example).

The input signal 201, including desired signal 204 and blocker signal 206, may also be input to a receive translational path 316. As part of receive translational path 316, the input signal 201 may be input to a mixer 308. Mixer 308 may receive a local oscillator (LO) signal at an LO frequency ($f_{LO}$) and may down-convert the input signal 201 from RF to IF. The IF input signal is output from mixer 308 via line 309 to a filter, such as a high pass filter 310. Other types of filters, such as bandpass and lowpass filters may be used, depending on the design and the situation. After being down-converted to IF, such as an IF of 200 KHz, the desired signal 204 may be near 200 KHz, while the blocker signal 206 at IF is still 70 MHz greater than the desired signal 204. Thus, the blocker signal 206 may be at around 70 or 70.2 MHz, according to an illustrative example.

Because the desired signal 204 is now at IF, which may be a relatively low frequency, e.g., around 200 KHz or other frequency, and the blocker signal 206 may be at a frequency (e.g., 70 MHz) that is significantly higher than the frequency of the desired signal 204 at IF, a fairly inexpensive high pass filter 310 may be used to effectively filter or separate blocker signal 206 from desired signal 204 at IF. For example, high pass filter 310 may be a first or second order R-C (resistor-capacitor) filter, which may be provided on-chip and may be less expensive than an external SAW filter.

An example high pass filter transfer function 330 of an example high pass filter 310 is shown in FIG. 3, with signals near zero Hz being significantly or even completely attenuated, such as the desired signal 204 at around 200 KHz, with higher frequency signals, such as blocker signal 206 (e.g., at 70 Mhz) being passed. The numbers 200 KHz for IF for the desired signal 204 and a 70 MHz space for the blocker signal 206, etc., are merely provided as an illustrative example, and the various embodiments are not limited thereto. Other frequencies may be used.

High pass filter 310 may filter or separate at IF the blocker signal 206 from the desired signal 204, and output the separated blocker signal 206S at around IF (e.g., at about 70 MHz higher than IF, such as at 70.2 MHz in this example) onto line 311. Mixer 312 may receive an LO signal and may up-convert the separated blocker signal 206S from IF to RF (e.g., up convert the separated blocker signal 206 from 70 MHz back to around 2060 MHz in the illustrative example). The frequency of the LO signals input to mixers 308 and 312 may be the same frequency as the LO signals input to mixers 216 and 218, for example. Thus, the same LO signal used for mixers 216 and 218 may be input to mixers 308 and 312, with no separate LO generator being required.

The separated (and up-converted) blocker signal 206S at RF may then be input via line 314 to subtraction circuit 214. Subtraction circuit 214 may also receive as an input the input signal 201A (including desired signal 204 and blocker signal 206) via line 305. Subtraction circuit 214 may substantially subtract or remove or attenuate the blocker signal 206 from the received input signal 201A, based on the separated blocker signal 206S received from the receive translational path 316. Therefore, subtraction circuit 214 may output the desired signal 204 at RF onto line 307.

The separated blocker signal 206S may, in some cases, be the same as or substantially the same as the blocker signal 206 received on input signal 201. According to an example embodiment, the separated blocker signal 206S at around RF received via line 314 may have a slightly different amplitude or phase, for example, as compared to the blocker signal 206 of input signal 201A. For example, mixers 308 and 312 and HPF 310 may have altered the phase and/or amplitude of the blocker signal 206S output onto line 314, as compared to blocker signal 206. Thus, the blocker signals 206 and 206S received via lines 305 and 314, respectively, may not be exact matches, but rather, may vary to some degree in amplitude and/or phase. Although not required, according to an example embodiment, additional phase or amplitude adjustment or compensation may be introduced in the receive main path 301 and/or in the receive translational path 316 to compensate for such errors or differences in the two blocker signals input to subtraction circuit 214. According to an example embodiment, as long as these blocker signals 206, 206S are sufficiently close in amplitude and phase, the subtraction circuit 214 may typically be able to effectively subtract or remove or attenuate at least a portion of the blocker signal 206 in the input signal 201A based on the separated blocker signal 206S, e.g., to provide a 20-40 dB attenuation, for example, in the blocker signal 206 of the input signal 201A. The example number of 20-40 dB is not required, but merely provided as an example. Other numbers or amounts for a signal reduction may be used, for example.

An overall transfer function 340 is illustrated in FIG. 3. The transfer function 340 may represent the transfer function of the receive translational path 316 in combination with the subtraction circuit 214, for example. The transfer function 330 of HPF 310 may be translated or up converted to around the LO frequency, and then inverted by the subtraction process at circuit 214, resulting in a relatively sharp bandpass filter as shown, which effectively may substantially pass only the desired signal 204 and may substantially filter or remove the blocking signal 206, for example.

As noted above, at IF frequencies, a fairly sharp, high Q filter, such as high pass filter 310 may be provided using relatively inexpensive first or second order RC filters. After the transfer function 330 of this high pass filter is up-converted and inverted, the overall operational result (shown as transfer function 340) may be considered to be a fairly sharp, high Q bandpass filter that is effectively provided at RF. In other words, the down-conversion to IF, filtering or separation, and up-conversion within translational path 316 along with the subtraction at circuit 214 may allow the use of a traditional, lower cost RC filter at IF to provide approximately or effectively the same operation or transfer function 340 which might typically be provided by an external SAW filter operating at RF, but at a lower cost, for example.

In an example embodiment, the bandwidth or 3 dB roll off points of the effective bandpass filter in RF shown in overall transfer function 340 may be determined by or based upon the 3 dB roll off points for the HPF 310. Also, to avoid significant phase shift through receive translational path 316, the bandwidth of mixers 308 and 312 may be or should be significantly greater than the value or frequency of the RF input signal, for example.

In an example embodiment, the 3 dB insertion loss that may typically be introduced by a SAW filter may also be avoided through the use of the subtraction circuit and translational path 316, for example. According to an example embodiment, this decrease in cost and avoiding the 3 dB loss of the SAW filter may be provided through an increase in power consumption via mixers 308 and/or 312, and possible introduction of noise by mixers 308 and/or 312 within translational path 316. In some cases, active mixers may generate noise, while passive mixers typically may not introduce noise or as much noise. However, according to some standards, in the presence of a blocker signal, the receive noise figure may be relaxed by 3 dB. Thus, some additional noise introduced by mixers 308 and 312 and filter 310 is not typically a problem.

With the presence of filter 310 after mixer 308, an active mixer may be used for mixer 308 since noise generated by mixer 308 may be filtered or removed by filter 310. On the other hand, it may be desirable to use a lower noise mixer for mixer 312, since mixer 312 is located after filter 310. Thus no filtering is provided for output of mixer 312 in an example embodiment. Therefore, according to an example embodiment, mixer 308 may be an active mixer such as a Gilbert type mixer, while mixer 312 may be a passive mixer such as a current commutator, although this is merely an example embodiment. Filter 310 may, for example, substantially filter noise introduced by active mixer 308, while a passive mixer or lower noise mixer may be used for mixer 312, for example.

According to an example embodiment, a power detector 320 may be provided, e.g., along the receive main path 301, to detect the presence of a blocker signal 206. The power detector may, for example, detect presence of a blocker signal 206 by detecting a power or amplitude of a received signal 201 that may be significantly greater than the expected amplitude or power of the desired signal 204. Other types of detectors may be used. In an example embodiment, although not required, mixers 308 and/or 312 may be turned off, and then powered on when a blocker signal is detected by power detector 320, for example. Power detector 320 may output a control signal via line 322 to enable or power on mixers 308 and 312 and filter 310. This allows the blocker signal to be filtered or removed when present, but otherwise avoids spending power (and noise introduced by) mixers 308 and 312 and filter 310 when no blocker signal is present, in an example embodiment.

Also, referring to FIG. 3, LNA 210 may be provided in at least two different locations. The LNA 210 may be provided before the subtraction circuit 214 as shown in FIG. 3. In such an arrangement, less noise may be introduced with such an arrangement, and the LNA 210 should be designed to sufficiently handle a large blocker signal without saturating. On the other hand, the LNA 210 may also be provided after subtraction circuit 214. By providing the LNA 210 after subtraction circuit 214, this may decrease the likelihood of the LNA 210 saturating from receiving a large blocker (since blocker should be filtered before LNA 210), but the noise from translational loop 316 may be amplified by LNA 210.

Figure 4:
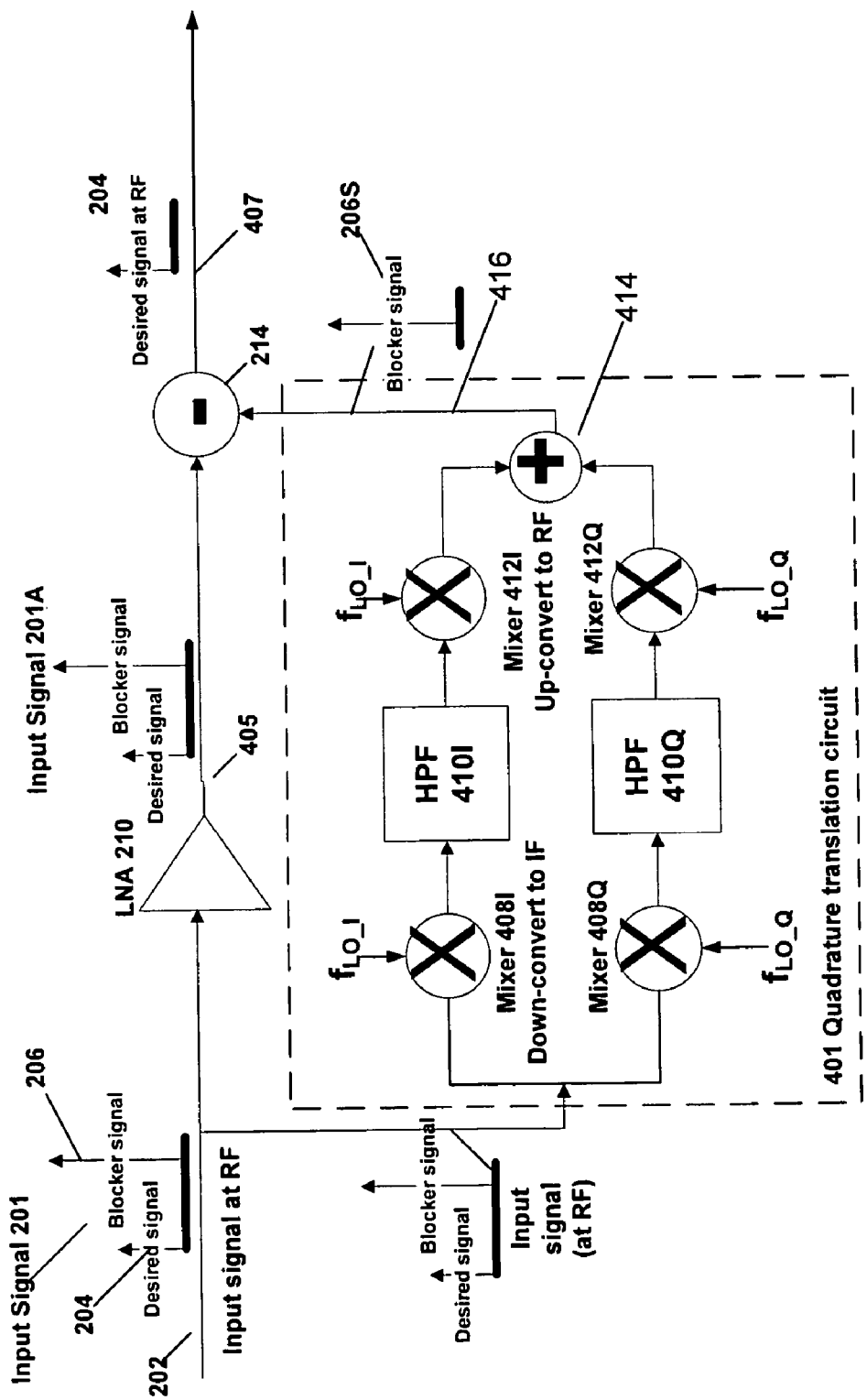
FIG. 4 is a block diagram of a circuit that may be provided in a wireless receiver according to another example embodiment.

FIG. 4 is a block diagram of a circuit that may be provided in a wireless receiver according to another example embodiment. In the circuit of FIG. 4, mixers 308 and 312 (FIG. 3) are replaced with quadrature mixers, and a double filter is used, according to an example embodiment. As compared to a single mixer, quadrature mixers may allow for the removal or cancellation of unwanted sidebands, for example.

Referring to FIG. 4, an input signal 201, including a desired signal 204 and a blocker signal 206 (at least in some cases) is input to a quadrature translation circuit 401. Quadrature translation circuit 401 may include an in-phase mixer 408I that receives an in-phase LO signal ($f_{LO\_I}$), and quadrature mixer 408Q that receives a quadrature LO signal ($f_{LO\_Q}$). Mixers 408I and 408Q down-convert the received input signal 201 from RF to IF. The down-converted in-phase signal from mixer 408I is input to high pass filter (HPF) 410I, while down-converted quadrature phase signal from mixer 408Q is input to HPF 410Q. The HPFs 410 may filter or separate in IF the blocker signal 206 from the desired signal. The separated blocker signal output from filters 410I and 410Q in IF are input to mixers 412I and 412Q, respectively. Mixers 412I and 412Q receive in-phase and quadrature phase LO signals, and may up-convert the separated blocker signal back to RF. The in-phase and quadrature phase outputs from mixers 412I and 412Q are combined or added at adder circuit 414, to output a separated blocker signal 206S onto line 416. Subtraction circuit 214 may substantially subtract or remove or attenuate the separated blocker signal 206S from the input signal 201A and output the desired signal 204 onto line 407, as described above with respect to FIG. 3.

Figure 5:
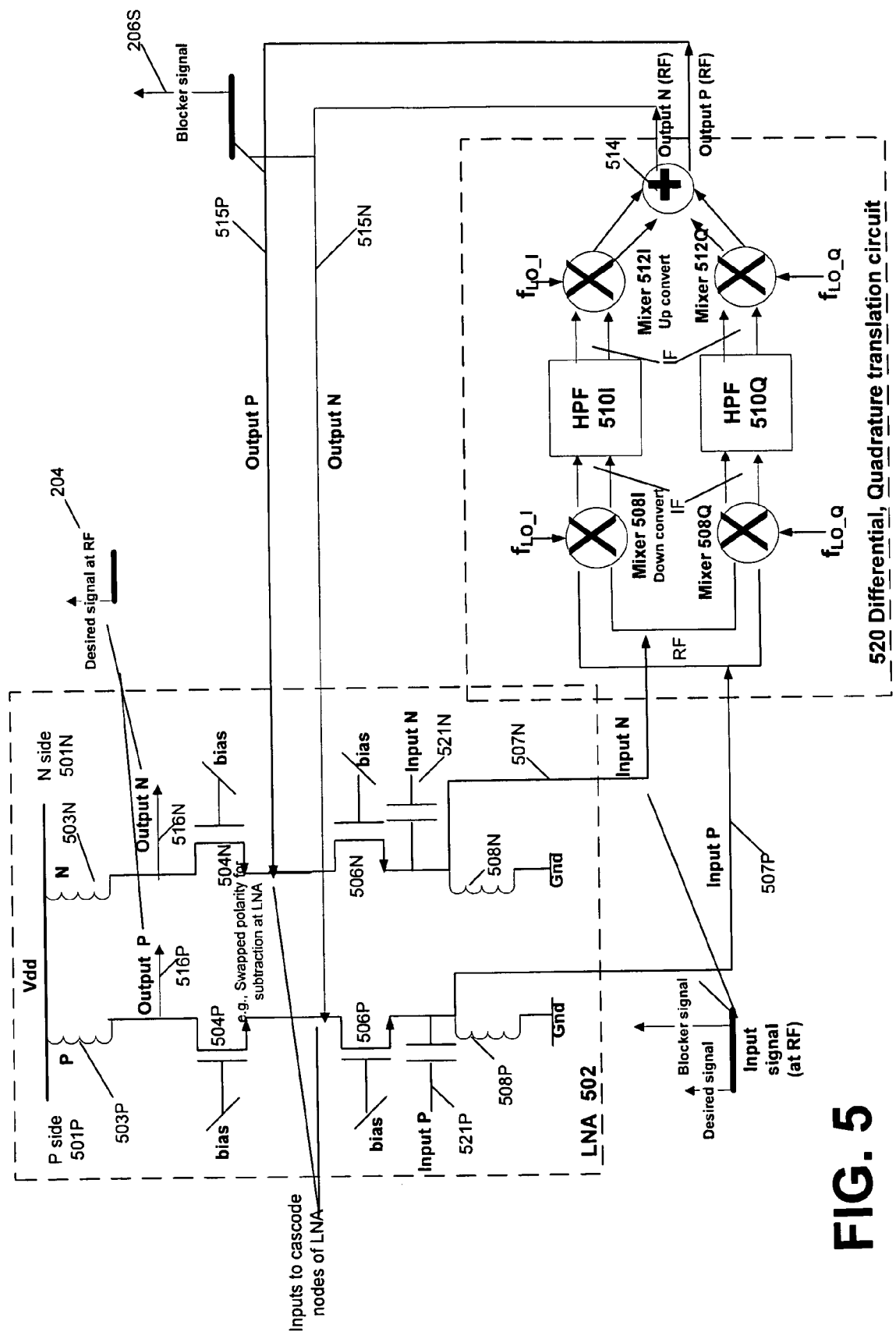
FIG. 5 is a block diagram of a circuit that may be provided in a wireless receiver according to yet another example embodiment.

FIG. 5 is a block diagram of a circuit that may be provided in a wireless receiver according to yet another example embodiment. The circuit illustrated in FIG. 5 may include an LNA 502 coupled to a differential quadrature translation circuit 520. LNA 502 may be a differential LNA, that may include a positive (or P) side 501P, and a negative (or N) side 501N. The P side 501P may include an inductor 503P coupled to a voltage supply Vdd. A positive output from LNA 502, provided via line 516P, is coupled to a lower end of inductor 503P. P side 501P also includes transistors 504P and 506P coupled in series. Bias voltages may be applied to the gates of each of transistors 504P and 506P. An inductor 508P is coupled between a drain of transistor 506P and ground (gnd). A positive input (input P) to LNA 502 is input at line 521P via a capacitor as shown.

The N side 501N of LNA 502 is similarly arranged as the P side. The N side 501N may similarly include an inductor 503N coupled to Vdd. An output N is coupled to a lower end of inductor 503N. Transistors 504N and 506N may be coupled in series between inductors 503N and 508N. A negative output, output N, provided via line 516N, is provided between inductor 503N and transistor 504N. Bias voltages are applied to gates of transistors 504N and 506N. A negative input (input N) is provided via line 521N and via a capacitor to LNA 502 as shown. The transistors 504, 506 may include MOSFETS (metal oxide field effect transistors), for example, or other types of transistors.

The negative and positive inputs (input N and input P) of LNA 502 are both coupled via lines 507N and 507P to in-phase mixer 508I and quadrature-phase mixer 508Q of translation circuit 520. Mixers 508I and 508Q provide quadrature down conversion of the received input signal 201 (including desired signal 204 and blocker signal 206) from RF to IF. The positive and negative IF signals from mixers 508I and 508Q are input to high pass filters, HPF 510I and 510Q, respectively, to separate or filter the blocker signal from the desired signal at IF. The separated blocker signals from HPF 510I and 510Q are input to mixers 512I and 512Q, respectively, to up-convert the separated blocker signal from IF to RF. The positive and negative signals output at RF from both mixer 512I and mixer 512Q are combined or added by adder circuit 514. Thus, adder circuit 514 may output a positive signal (output P) and a negative signal (output N) of the separated blocker signal, via lines 515P and 515N, respectively.

LNA 502 may perform current addition or subtraction, based on the inputs and how the inputs are configured. The positive input (input P) via line 521P and negative input (input N) via line 521N may include the input signal 201 (including both the desired signal 204 and blocker signal 206). The blocker signal 206S may be output via lines 515P and 515N from translation circuit 520. The blocker signal 206S provided via lines 515P and 515N may be coupled to cascode nodes of LNA 502. The cascade nodes of LNA 502 are low impedance nodes, and provide good locations to inject currents from outputs of quadrature translation circuit 520 into LNA 502.

In order to provide subtraction at LNA 502, the polarity of outputs from translation circuit 520 should be swapped when applied to cascade nodes of LNA 502. Thus, for example, the positive output (output P) provided via line 515P from translation circuit 520 should be applied to the cascode node on the negative side (N side 501N), while the negative output (output N) provided via line 515N should be applied to the cascode node on the positive side (501P) of LNA 502. Swapping of the polarity for inputs at LNA 502 allows the separated blocker signal 206S from translation circuit 520 to be substantially subtracted from the input signal 201, and thereby substantially outputting the desired signal 204 onto output P and output N via lines 516P and 516N, respectively. For example, in operation, currents output via lines 515P and 515N from differential quadrature translation circuit 520 are added (with reverse polarity) to the currents of input signals received via input lines 521P and 521N. The circuit of FIG. 5 is merely one example embodiment, and the disclosure is not limited thereto. Many other configurations may be used.

Although not shown in FIG. 3, the circuits of FIG. 3 may include receiver IF section 220 and receiver DSP 222 (shown in FIG. 2). Although not shown in FIGS. 4 and 5, the circuits of FIGS. 4 and 5 may include mixers 216 and 218, and receiver IF section 220 and receiver DSP 222.

Figure 6:
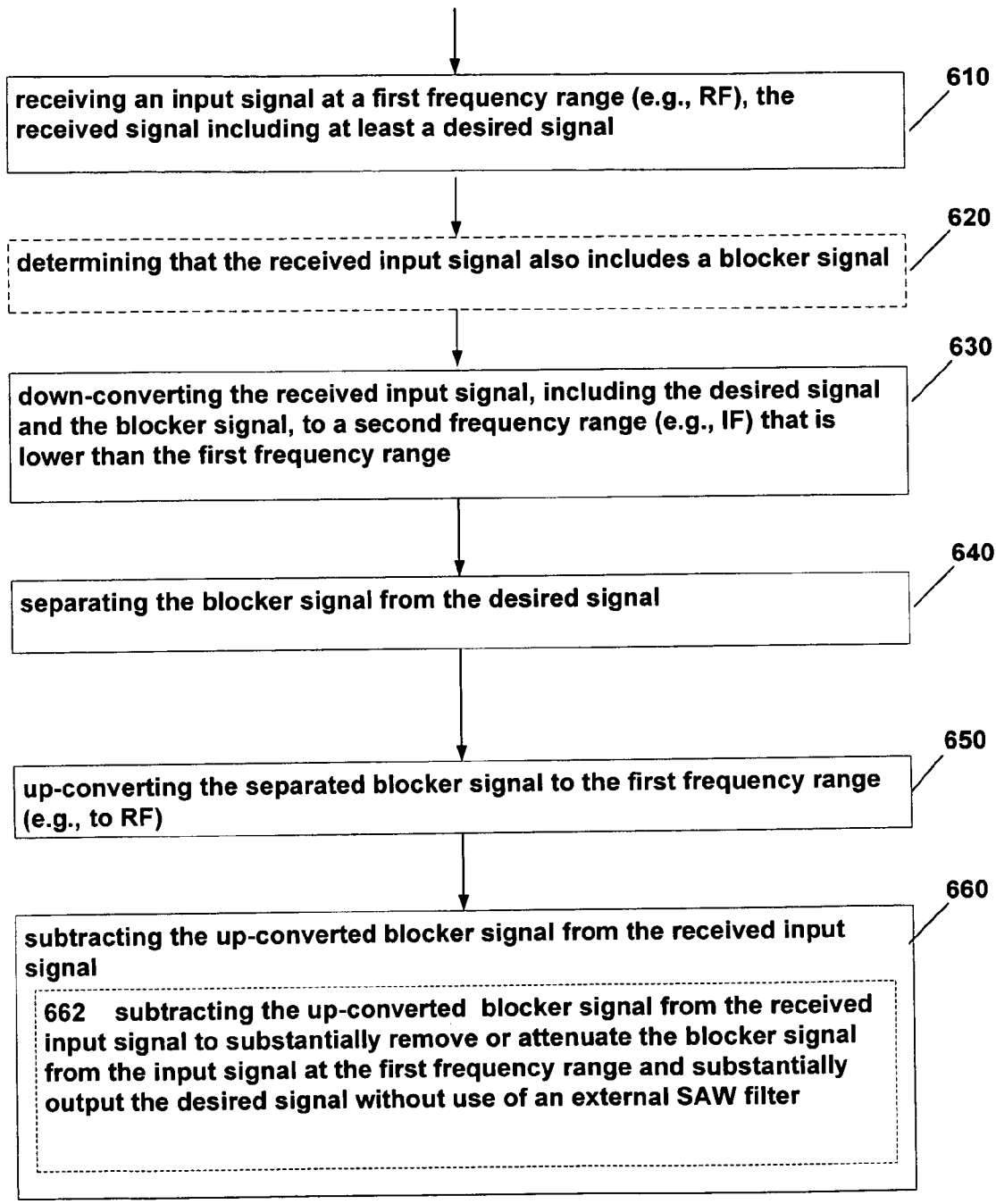
FIG. 6 is a flow chart illustrating operation of a wireless receiver according to an example embodiment.

FIG. 6 is a flow chart illustrating operation of a wireless receiver according to an example embodiment. At 610, an input signal at a first frequency range (e.g., RF) is received. The received signal may include at least a desired signal. In some instances, the input signal may also include a blocker signal.

At 620, it is determined that the received signal also includes a blocker signal. Operation 620 may be optional, and may be performed using a detector, such as a power detector, for example, or other device or circuit (e.g., blocker signal detected by detecting an amount of power on received input signal that is significantly greater than the amount of power associated with a desired signal). At 630, the received signal may be down-converted to a second frequency range (e.g., IF) that is lower than the first frequency range (e.g., RF). The received input signal may include the desired signal and the blocker signal.

At 640, the blocker signal may be separated from the desired signal. This may be performed, for example, using a filter such as a high pass filter at the second frequency range (e.g., IF).

At 650, the separated blocker signal is up-converted to the first frequency range (e.g., back to RF). At 660, the separated and up-converted blocker signal may then be subtracted from the received input signal. For example, operation 660 may include subtracting the up-converted blocker signal from the input signal to substantially remove or attenuate the blocker signal from the input signal at the first frequency range (e.g., RF) and substantially output the desired signal. In an example embodiment, the blocker may be substantially subtracted from the input signal at the first frequency range without use of an external SAW filter.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
 receiving an input signal within a first frequency range, the input signal including a desired signal and a blocker signal;
 down-converting the input signal to a second frequency range that is lower than the first frequency range;
 separating the blocker signal from desired signal;
 up-converting the separated blocker signal to the first frequency range;
 subtracting the up-converted blocker signal from the input signal.

2. The method of claim 1 wherein the subtracting comprises subtracting the up-converted blocker signal from the input signal to substantially remove or attenuate the blocker signal from the input signal at the first frequency range and substantially output the desired signal, without use of an external SAW filter.

3. The method of claim 1 wherein the receiving comprises receiving an input signal at an RF frequency range, the received signal including a desired signal and a blocker signal.

4. The method of claim 1 wherein the down-converting comprises down-converting the received signal from an RF frequency range to an IF frequency range that is lower than the RF frequency range.

5. The method of claim 1 wherein the separating comprises using a high pass filter to separate the blocker signal from the desired signal at an IF frequency range.

6. The method of claim 1 wherein the up converting comprises up converting the blocker signal from an IF frequency range to an RF frequency range that is higher than the IF frequency range.

7. The method of claim 1 wherein the subtracting comprises:
 applying a 180 degree phase shift to the separated blocker signal; and adding the phase-shifted blocker signal to the received signal at RF frequency range to obtain the desired signal at an RF frequency range.

8. A method comprising:
receiving an input signal at a first frequency range, the received signal including at least a desired signal;
determining that the received signal also includes a blocker signal;
down-converting the received signal, including the desired signal and the blocker signal, to a second frequency range that is lower than the first frequency range;
separating the blocker signal from the desired signal;
up-converting the separated blocker signal to the first frequency range; and
subtracting the up-converted blocker signal from the received signal.

9. The method of claim 8 wherein the subtracting comprises subtracting the up-converted blocker signal from the input signal to substantially remove or attenuate the blocker signal from the input signal at the first frequency range without use of an external SAW filter.

10. The method of claim 8 wherein the first frequency range comprises an RF frequency range, the down-converting comprises down-converting the received signal, including the desired signal and the blocker signal, from an RF frequency range to an IF frequency range.

11. The method of claim 8 wherein the first frequency range comprises an RF frequency range and the second frequency range comprises an IF frequency range, the up-converting comprises up-converting the separated blocker signal from the RF frequency range to the IF frequency range.

12. An apparatus provided in a wireless receiver, the apparatus comprising:
a first mixing circuit to receive an input signal at a first frequency range, the input signal including at least a desired signal, the input signal also including a blocker signal in some cases, the first mixing circuit configured to down-convert the received input signal from the first frequency range to a second frequency range that is lower than the first frequency range;
a filter configured to separate the blocker signal, if present, from the desired signal;
a second mixing circuit configured to up-convert the separated blocker signal to the first frequency range; and
a subtraction circuit configured to substantially subtract or remove the separated blocker signal, if present, from the input signal at the first frequency range to substantially output the desired signal.

13. The apparatus of claim 12 wherein the subtraction circuit comprises a subtraction circuit configured to substantially subtract or remove the separated blocker signal, if present, from the input signal at the first frequency range without use of an external SAW filter.

14. The apparatus of claim 12 wherein the subtraction circuit comprises an amplifier configured to receive the input signal and to substantially attenuate or remove the separated blocker signal, when present, from the input signal at the first frequency range to substantially output the desired signal, without use of an external SAW filter.

15. The apparatus of claim 12 wherein the first mixing circuit comprises a pair of mixers provided as a quadrature mixer, wherein the filter comprises a pair of filters, one of said filters coupled to one of the quadrature mixers of the first mixing circuit, and wherein the second mixing circuit comprises a pair of mixers provided as a second quadrature mixer.

16. The apparatus of claim 12 wherein the first mixing circuit comprises an active mixing circuit, and the second mixing circuit comprises a passive mixing circuit.

17. The apparatus of claim 12 wherein the first mixing circuit comprises a Gilbert type mixer, and the second mixing circuit comprises a current commutator mixer.

18. The apparatus of claim 12 and further comprising a detector configured to detect the presence of the blocker signal in the input signal, the first and second mixing circuits being operable in response to the detection of the blocker signal.

19. The apparatus of claim 12 wherein the filter comprises a high pass filter.

20. The apparatus of claim 19 wherein the high pass filter provides a transfer function, and wherein an overall transfer function of the apparatus is based upon an inverted and frequency shifted transfer function of the high pass filter.

* * * * *